3,270,083
EXTRACTION OF 1,3-BUTADIENE
Ernst Peukert, Schloss Born, Taunus, Germany, assignor to Bunawerke Huls G.m.b.H., Marl, Germany
No Drawing. Filed Sept. 13, 1965, Ser. No. 487,072
Claims priority, application Germany, Sept. 18, 1964, B 78,587
8 Claims. (Cl. 260—681.5)

This invention relates in general to an improved process for the separation of 1,3-butadiene, and in particular to its separation from an aqueous solution of a cuprous salt.

The separation of the butadiene from hydrocarbon mixtures, as produced by the dehydrogenation of n-butane and n-butene, or by the thermal cracking of higher-molecular weight hydrocarbons, is preferably conducted by selective extraction with solutions of a cuprous salt, especially cuprous ammonia complexes, and particularly cuprous ammonium acetate (CCA).

This method is a three-stage process. In the first stage, butadiene is absorbed or extracted, together with butenes and other unsaturated impurities, by the CAA solution of which the effective component is cuprous diammine acetate; in the second stage, the butadiene is enriched using recycling butadiene as the enriching agent; and in the third stage, the butadiene is separated from the enriched solvent by desorption.

The apparatus for extracting and enriching butadiene is preferably comprised of a number of series-connected mixer-settler assemblies. A raw butadiene-containing stream in the liquid phase is introduced at about the middle of the series in accordance with conventional solvent extraction techniques. The CAA solution, cooled to about $-15°$ C., and under 3–4 atmospheres (gauge) is passed in a countercurrent manner against the butadiene-containing hydrocarbon liquid, the butadiene being washed out completely, and the butenes partially. The residual hydrocarbons free of butadiene are recycled to the stage where the butadiene is produced, e.g. dehydrogenation. The solution saturated with butadiene and butenes is passed through the butadiene enriching stage. Here, the butenes are removed from the solution by recycle butadiene. The necessary quantity of recycle butadiene is obtained in the final stripper by heating the CAA solution.

Because of the exothermic nature of the solvent extraction process, the temperature in the mixer-settler battery rises from $-15°$ C. to about $0°$ C., and then in the final stripper employed for the partial separation of butadiene, the temperature is raised to approximately $30°$ C.

The resultant partially stripped CAA solution which contains butadiene to the practical exclusion of other $C_4$ compounds is depressurized in the third process stage. The apparatus essentially comprises a desorption column. The solution is charged to the head of the column at about $25°$ C. By adjusting the sump to a temperature of about $80°$ C. and a pressure of about 1 atmosphere gauge corresponding to about 0.1 atmosphere gauge at the head of the column, the butadiene is completely flashed off. The resultant degasified CAA solution is then recycled to the extraction stage.

A considerable amount of ammonia escapes together with the butadiene, and is separated and recovered by washing with water. The ammonia-free butadiene is then liquefied by compression and purified by distillation.

When this CAA process is conducted on an industrial scale, considerable difficulties are encountered. These are manifested in the first two process stages by emulsion formation which impairs the settling and separation of the hydrocarbon phase and the CAA solution phase, thereby substantially reducing the efficiency of the system. A problem is also encountered in the third stage due to foaming of the CAA solution in the desorber. Additionally, corrosion occurs in the gas chambers underneath the column plates.

The formation of emulsion in the extraction apparatus and the foam in the desorption apparatus are caused by acetylenic impurities in the raw products which are converted by polymerization to emulsifiers. Heretofore, little was known about the composition of these emulsifiers or how they are formed.

An object of this invention, therefore, is to investigate the composition of and conditions of formation of such emulsifiers.

Another object is to provide a process wherein such emulsifiers are substantially eliminated.

A still further object is to provide an improved desorption step wherein the emulsifiers are separated from the CAA solution.

Upon further study of the specification and claims other objects and advantages of the present invention will become apparent.

It has been discovered that the emulsifiers are produced predominantly from vinyl and ethyl acetylene, and that there are first formed $C_7$- and $C_8$-hydrocarbons having a centrally or nearly centrally positioned acetylene group and additional double bonds. A typical sample taken from an operating extraction apparatus has the following composition:

| Gas chromatography first runnings. | Unidentified | ~5% |
|---|---|---|
| $C_7H_{10}$ | $\begin{matrix}C-C-C=C-C\equiv C-C\\C-C-C\equiv C-C=C-C\end{matrix}$ cis and trans | ~0.5% |
| $C_7H_8$ | $\begin{matrix}C=C-C=C-C\equiv C-C\\C=C-C\equiv C-C=C-C\end{matrix}$ cis and trans | ~1.5% |
| $C_8H_{12}$ | $C-C-C\equiv C-C=C-C-C$ cis and trans | ~2% |
| $C_8H_{10}$ | $\begin{matrix}C=C-C\equiv C-C=C-C-C\\C=C-C=C-C\equiv C-C-C\end{matrix}$ cis and trans | ~11% |
| $C_8H_8$ | $C=C-C=C-C\equiv C-C=C$ cis and trans | ~80% |

The formation of these substances occurs rapidly and is substantially completed after passing only once through the first two process stages wherein temperatures up to $30°$ C. are encountered. However, it was discovered that mixtures of substances of this type surprisingly do not exhibit any significant emulsifying effect at such temperatures. Only after heating $C_7/C_8$-olefin-containing cuproammonium acetate solutions above $50°$ C., is there a tendency to emulsify. Furthermore, when heating the solutions above $70°$ C., the tendency to form stable emulsions sharply increases.

To illustrate this newly discovered phenomenon, the following values indicating emulsification tendencies were determined in CAA solutions mixed with 500, 1,000, and 1,500 p.p.m. of the $C_7/C_8$-olefin mixture, after a heating period of one hour to $80°$ C. as compared to merely standing 1 hour at $20°$ C. The emulsion test comprises stirring the CAA solutions with a butadiene-free $C_4$-hydrocarbon mixture at $-8°$ C. and subsequent determination of the time required for the separation of the mixture into two layers of liquid:

| $C_7/C_8$-olefin admixture to the CAA solution, p.p.m. | After 1 hr. at $20°$ C. | Separation period in minutes and seconds after 1 hour's heating to $80°$ C. |
|---|---|---|
| 0 | 1'50" | 1'55" |
| 500 | 2'00" | 4'40" |
| 1,000 | 2'05" | 6'50" |
| 1,500 | 2'15" | 8'40" |

With respect to the process of formation of the emulsifiers in the manufacturing operation, it was determined that these are produced only at the higher temperatures of the third process stage. As they cannot be distilled off in the desorber sprayed with cold CAA solution, because of their high boiling range, they are enriched in the desorber sump and return from there, together with the CAA solution, to the first two process stages where they lead to the formation of emulsions.

The desorption is always conducted, as seen from U.S. Patent No. 2,429,134 and the German Patents No. 817,305 and No. 852,540, as well as from the publication in "Petroleum Refiner," 36, No. 11, p. 294 (1957), based thereon, and "Ullmann's Encyclopädie der technischen Chemie" (Ullmann's Encyclopedia of Technical Chemistry), vol. 10, 166, also based thereon, by degasifying the butadiene at temperatures around 80° C. and at a pressure in the sump of the desorption column of about 0.7 to 0.9 atmosphere gauge.

It is true that it has already been proposed in German Patent 1,101,397 to distill a partial stream of the recycle butadiene from the final separator before it is recycled into the butadiene enriching stage. However, even without considering the fact that additional distillation capacity is required for this purpose, the proposed remedy is inadequate because it is impossible to separate sufficient quantities of the deleterious substances thereby. This is the case because, in correspondence with the law of distribution, the main proportion of these deleterious substances remains in the CAA solution.

Other suggestions, such as prewashing the raw products from the butadiene production with CAA solution; or catalytically pre-hydrogenating or treating the CAA solution with active charcoal are, on the one hand, expensive and cumbersome, and, on the other hand, relatively ineffective.

It has now been surprisingly discovered that it is possible to separate the emulsifiers and precursors thereof from the CAA solutions employed for the production of butadiene from butadiene-containing hydrocarbon mixtures in a simple and effective manner by a process divided into a butadiene extraction stage, butadiene enriching stage, and pure butadiene desorbing stage, by separating the butadiene, during the desorption, at above 40° C.—and of most importance—at least partially in the liquid stage.

The pure butadiene thus is not separated, as previously done, at atmospheric or only slightly above atmospheric pressure in the gaseous phase, but in the liquid phase by maintaining suitable pressures and temperatures. By this novel technique, it is thereby possible to remove practically the entire amount of the deleterious $C_7/C_8$-hydrocarbons from the CAA solution in the desorber by virtue of the fact that these $C_7/C_8$-hydrocarbons are dissolved in the liquid phase butadiene.

According to a preferred embodiment, the process is conducted in such a manner that the CAA solution containing butadiene and emulsifiers which exist from the final separator of the enriching stage with a temperature ranging above 40° C. is introduced into a simple pressure separator, under such conditions that the butadiene dissolved by the CAA solution is separated in liquid form. This is accomplished if a pressure is selected which is above the ambient butadiene vapor pressure at the selected temperature. Preferred temperature and pressure ranges are, for example, 50–90° C. and 6–15 atm. gauge (it being necessary of course to employ higher pressures for higher temperatures to produce liquid butadiene). The process is preferably conducted at about 80° C. and 12 atm. gauge.

According to another and most preferred embodiment of the process, the butadiene can be separated in liquid form in a plurality of series-connected pressure stages, instead of in only one single pressure stage. In this embodiment, temperatures are used which increase from stage to stage. In the case of a two-stage process wherein the solution, brought, for example, to a pressure of 12 atm. gauge, is subjected in the first stage to a temperature of, for example, 50° C. and in the second stage to a temperature of 80° C., there can be seen the advantage that the main quantity of the $C_7/C_8$-olefins is separated in the first stage, before emulsifiers can even be formed from these olefins.

It is also possible to separate a part of the butadiene dissolved by the CAA solution in the liquid phase by the use of superatmospheric pressure, and then to separate the remainder conventionally in the gaseous form, using atmospheric or slightly increased pressure. For the second pressure stage, a conventional pressure of about 1 atm. gauge in the sump is employed. Preferably, the major portion of the butadiene, for example about 90%, is separated in the liquid phase by preferably heating to 60° C. at 8 atm. gauge, and the rest is separated conventionally in the gaseous phase in the desorption column. Here, the purification effect is almost the same as if the butadiene were separated completely in the liquid phase. This manner of conducting the process offers the advantage of being adaptable to existing plants.

In addition to the good purification effect obtained, the process of this invention has other substantial advantages. The large, corrosion-sensitive desorption column is replaced by a relatively small pressure separator wherein no corrosive damage can occur because gas chambers are avoided. The butadiene compressor is eliminated, as well as the apparatus for washing out and recovering the ammonia, as practically no ammonia exists in the gaseous form with the butadiene separated in the liquid phase. The elimination of the butadiene compression and the ammonia regeneration leads to a tangible savings in the energy requirements of the plant. Additionally, because superatmospheric pressure is maintained, the ammonia content of the CAA solutions can be increased, and thus their complexing activity for butadiene. Finally, when employing CAA solutions containing methanol or ethyl alcohol, alcohol recovery problems are virtually eliminated.

Without further elaboration, it is believed that one skilled in the art can, using the preceding description, utilize the present invention to its fullest extent. The following preferred specific embodiments are, therefore, to be constructed as merely illustrative, and not limitative of the remainder of the specification and claims in any way whatsoever.

*Example 1*

A catalytic dehydrogenation plant for n-butane produces an hourly yield of 49 tons of a $C_4$-hydrocarbon mixture containing on a weight basis 15.3% butadiene, and as impurities 590 p.p.m. acetylenes, namely 45 p.p.m. methyl, 240 p.p.m. ethyl, and 305 p.p.m. vinyl acetylene. This mixture is passed through a system comprising 10 mixer-settler combinations and a final settler. The butadiene is adsorbed by the CAA solution, and the remaining 41.6 tons per hour of butadiene-free $C_4$-hydrocarbon mixture having 130 p.p.m. high boiling residue are recycled to the dehydrogenation plant.

By heating to 80° C. in the desorption stage, 7.3 tons per hour of pure butadiene are separated from the CAA solution. This stage is conducted according to the prior art at a pressure of 0.1 atm. gauge. The separated gaseous butadiene is practically free of high boiling residues and contains 4.3% by weight of $NH_3$. Approximately 80% of the deleterious acetylenes introduced from the catalytic dehydrogenation plant thereby remain in the process stream.

*Example 2*

Example 1 is repeated except that the desorption of butadiene is conducted under a superatmospheric pressure of 12 atmospheres. In this way the butadiene is separated in the liquid phase and contains 3,120 p.p.m. high boiling residue, chiefly $C_7/C_8$-olefins and 15 p.p.m. $NH_3$. This latter stream together with the butadiene-free $C_4$-hydrocarbon mixture returned to the dehydrogenation plant accounts for the removal of about 97% of the deleterious acetylenes.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the separation of butadiene from butenes which comprises the steps of (A) passing a mixture of 1,3-butadiene and butenes into a solution of cuprous ammonium acetate to selectively absorb said 1,3-butadiene, and (B) desorbing said solution to separate said 1,3-butadiene, the improvement comprising conducting said desorbing at above 40° C. under sufficient pressure to separate said 1,3-butadiene in the liquid phase.

2. A process for the separation of 1,3-butadiene from a solution comprising 1,3-butadiene and cuprous ammonium acetate, which process comprises heating said solution to above 40° C. and under a sufficient pressure to separate at least a portion of said 1,3-butadiene in the liquid phase.

3. A process as defined by claim 2 wherein the major portion of the 1,3-butadiene is separated in the liquid phase.

4. A process as defined by claim 2 wherein all of the 1,3-butadiene is separated in the liquid phase.

5. A process as defined by claim 2 wherein said heating is conducted in a plurality of series-connected zones under increasing temperatures and pressures.

6. A process as defined by claim 2 wherein a portion of the butadiene is separated in the gaseous phase.

7. A process as defined by claim 2 wherein the heating is conducted to 50–90° C. and under 6–15 atmospheres gauge.

8. A process by claim 2 wherein the heating is conducted to about 80° C. and under about 12 atmospheres gauge.

References Cited by the Examiner

UNITED STATES PATENTS 2,944,095   7/1960   Kupa et al. _____ 260—677

DELBERT E. GANTZ, *Primary Examiner.*

G. E. SCHMITKONS, *Assistant Examiner.*